United States Patent
Baskaran et al.

(10) Patent No.: US 9,118,943 B2
(45) Date of Patent: Aug. 25, 2015

(54) VIDEO ON DEMAND PROCESSING

(75) Inventors: Arjun Baskaran, Chennai (IN); Saurabh Gorecha, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 241 days.

(21) Appl. No.: 13/308,595

(22) Filed: Dec. 1, 2011

(65) Prior Publication Data

US 2013/0145406 A1 Jun. 6, 2013

(51) Int. Cl.
*H04N 21/239* (2011.01)
*H04N 21/258* (2011.01)
*H04N 21/266* (2011.01)
*H04N 21/472* (2011.01)

(52) U.S. Cl.
CPC ..... *H04N 21/2396* (2013.01); *H04N 21/25808* (2013.01); *H04N 21/26613* (2013.01); *H04N 21/47202* (2013.01)

(58) Field of Classification Search
None
See application file for complete search history.

(56) References Cited

U.S. PATENT DOCUMENTS

| 7,478,200 | B2 * | 1/2009 | Lee et al. | 711/133 |
| 8,208,906 | B2 * | 6/2012 | Farris et al. | 455/414.1 |
| 2004/0237104 | A1 * | 11/2004 | Cooper et al. | 725/38 |
| 2005/0132264 | A1 * | 6/2005 | Joshi et al. | 715/500.1 |
| 2007/0204300 | A1 * | 8/2007 | Markley et al. | 725/46 |
| 2008/0263621 | A1 * | 10/2008 | Austerlitz et al. | 725/139 |
| 2012/0099672 | A1 * | 4/2012 | Wan et al. | 375/295 |
| 2012/0233651 | A1 * | 9/2012 | Lee et al. | 725/110 |
| 2013/0124716 | A1 * | 5/2013 | Moreman et al. | 709/224 |

FOREIGN PATENT DOCUMENTS

WO    WO 2011043597 A3 *  7/2011

OTHER PUBLICATIONS

U.S. Appl. No. 61/249,259, Lee et al, p. 17.*
W O 2011/079694, Wan et al.*

* cited by examiner

*Primary Examiner* — Mark D Featherstone

(57) ABSTRACT

A device may include a communication interface configured to receive a request from a client device, where the request identifies a first video on demand (VOD). The device may also include logic configured to identify capabilities associated with the client device, the capabilities including at least one of a decoding capability of the client device, a content protection scheme supported by the client device, or a transport protocol via which the client device can communicate, and forward the request for the VOD to a service provider associated with providing the first VOD. The logic may also be configured to receive a media stream from the service provider, the media stream corresponding to the first VOD, process the media stream in accordance with the identified capabilities, and forward the processed media stream to the client device.

20 Claims, 6 Drawing Sheets

VIDEO ON DEMAND PROCESSING

BACKGROUND INFORMATION

Service providers frequently provide video on demand (VOD) content to customers. The VOD content may include movies, TV shows, etc. The service provider may provide an option for the customer to rent or purchase the VOD content. If the customer rents the content, he/she typically must watch the content within a fixed time window, whereas if he/she purchases the content, he/she is allowed to watch the content at any time and any number of times.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to providing VOD content to client devices located both inside and outside a customer's home. In one exemplary implementation, a media device may act as a proxy for client devices to ensure that VOD content is provided to the client devices in accordance with the capabilities of the client devices. For example, the media device may assess the decoding capability, of a client device, transport protocols supported by the client device and/or content protection techniques supported by the client device. The media device may then process the VOD content in accordance with the client device's capabilities and provide the processed VOD content to the client device.

Figure 1:
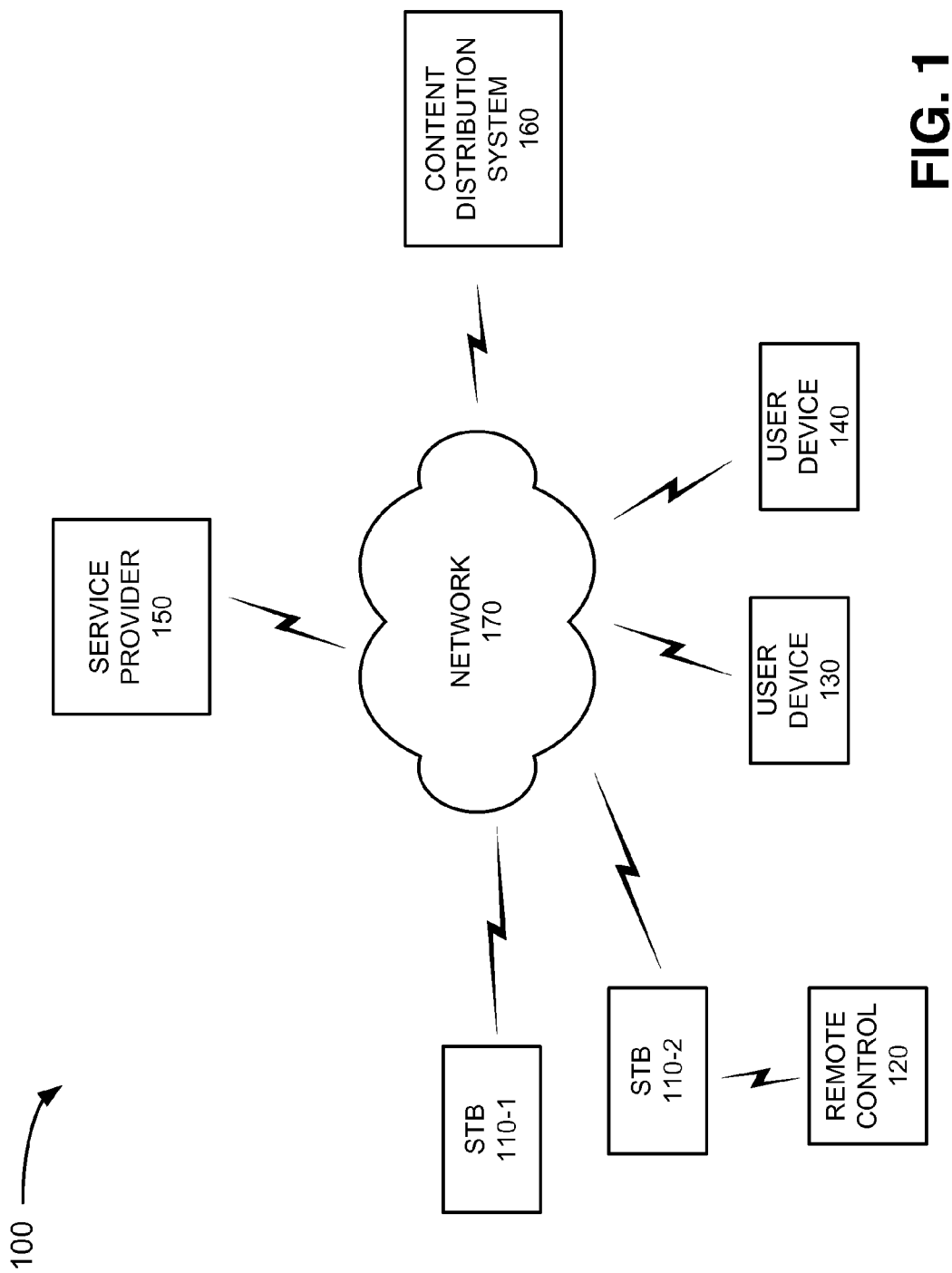
FIG. 1 illustrates an exemplary network in which systems and methods described herein may be implemented.

FIG. 1 is a diagram of an exemplary network 100 in which systems and methods described herein may be implemented. As illustrated, network 100 may include set top boxes (STBs) 110-1 and 110-2 (collectively "STBs 110" and individually "STB 110"), remote control 120, user devices 130 and 140, service provider 150, content distribution system 160 and network 170. Components of network 100 may interconnect via wired and/or wireless connections. STBs 110 and user devices 130 and 140 may be referred to herein as client devices.

STBs 110 may include devices that receive content, such as television programming, VOD content, etc., and provide the content to televisions or other output devices (not shown). STBs 110 may allow users to alter the programming provided to a television based on a signal (e.g., a channel up or channel down signal, etc.) from remote control 120 and/or one of users device 130/140. In one exemplary implementation, features of STBs 110 may be incorporated directly within televisions or other output devices.

Remote control 120 may include a device that allows a user to control programming (e.g., change channels) and/or content displayed on a television/output device via interaction with STBs 110. Remote control 120 may also allow a user to order various content, such as VOD content.

User devices 130 and 140 may each include a laptop computer, a tablet computer, a notebook computer, a personal computer (PC), an ultra mobile personal computer (UMPC), a netbook, a game-playing device/console, or other types of computation or communication devices, threads or processes running on these devices, and/or objects executable by these devices. User devices 130 and 140 may also include any type of communication device, such as a voice over Internet protocol (VoIP) telephone (e.g., a session initiation protocol (SIP) telephone), a personal digital assistant (PDA) that can include a radio, a mobile telephone (e.g., a cell phone), a smart phone (e.g., that may combine a cellular radio with data processing and data communications capabilities), etc. In one implementation, user devices 130 and 140 may include any device (e.g., an Internet Protocol (IP)-based device) that is capable of communicating via a network to obtain content, such as VOD content. User devices 130 and 140 may also be configured to interact with devices (e.g., STBs 110 and/or a home router (not shown) via a local network (e.g., a home wired or wireless network). User devices 130 and 140 may connect to network 170 via wired, wireless, or optical connections.

Service provider 150 may include one or more computing devices/systems, servers and/or backend systems that are able to connect to network 170 and transmit and/or receive information via network 170. In one implementation, service provider 150 may include a server (e.g., a computer system or an application), a cable head-end, and/or a broadcaster capable of providing content (e.g., TV programming, movies, VOD services, live television, news feeds, blog feeds, widgets, applications, etc.), advertisements, instructions, codes, encryption keys, and/or other information associated with products and/or services, etc., to STBs 110 and user devices 130 and 140. In some implementations, service provider 150 may be configured to receive information from STBs 110, user devices 130 and 140, and/or other devices in network 100, as described in detail below.

Content distribution system 160 may include one or more computing systems, servers, etc., that provide content. For example, content distribution system 160 may stream content, such as VOD content, to client devices located inside or outside a customer's home, as described below. In some instances, content distribution system 160 may not be affiliated with service provider 150. That is, content distribution system 160 may be an independent entity that provides content to users/viewers.

Network 170 may include one or more wired, wireless and/or optical networks that are capable of receiving and transmitting data, voice and/or video signals, including multimedia signals that include voice, data and video information. For example, network 170 may include one or more public switched telephone networks (PSTNs) or other type of switched network. Network 170 may also include one or more wireless networks and may include a number of transmission towers for receiving wireless signals and forwarding the wireless signals toward the intended destinations. Network 170 may further include one or more satellite networks, one or more packet switched networks, such as an Internet protocol (IP) based network, a local area network (LAN), a wide area network (WAN), a personal area network (PAN) (e.g., a wireless PAN), an intranet, the Internet, or another type of network that is capable of transmitting data.

The exemplary configuration illustrated in FIG. 1 is provided for simplicity. It should be understood that a typical network may include more or fewer devices than illustrated in FIG. 1. For example, although two STBs 110, one remote control 120, two user devices 130 and 140, one service provider 150, one content distribution system 160 and one network 170 have been illustrated in FIG. 1, in practice, there may be more STBs 110, remote controls 120, user devices 130 and 140, service providers 150, content distribution systems 160 and/or networks 170. Network 100 may also include additional elements, such as switches, gateways, routers, backend systems, etc., that aid in routing information, such as media streams from service provider 150 or content distribution system 160 to STBs 110 and/or user devices 130 and 140. Also, in some instances, one or more of the components of network 100 may perform one or more functions described as being performed by another one or more of the components of network 100.

Figure 2:
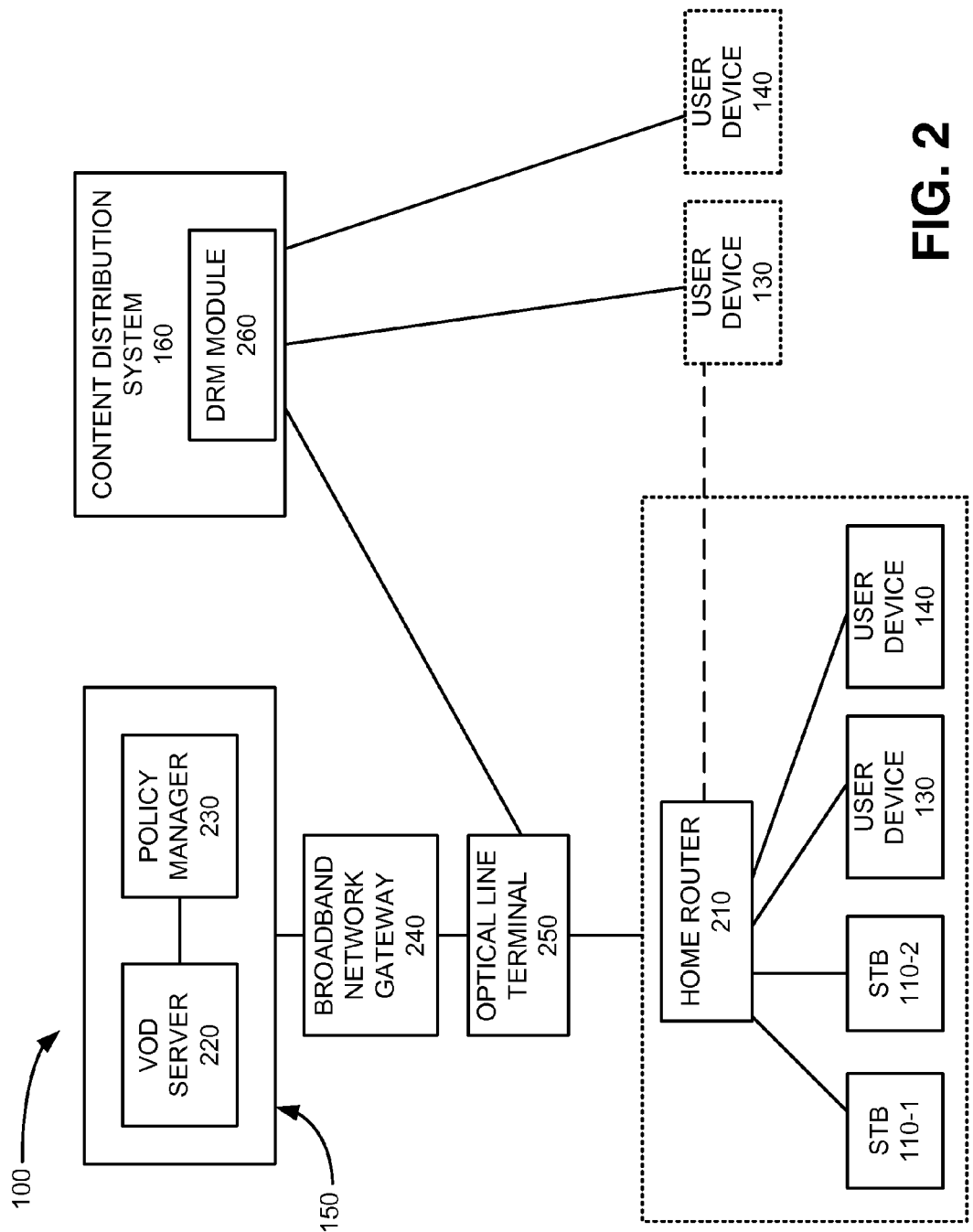
FIG. 2 illustrates an exemplary configuration of components implemented in the network of FIG. 1.

FIG. 2 illustrates exemplary components implemented in a portion of network 100. Referring to FIG. 2, network 100 may include home router 210, VOD server 220, policy manager 230, broadband network gateway (BNG) 240, optical line terminal (OLT) 250 and digital rights management (DRM) module 260.

In an exemplary implementation, home router 210, STBs 110, user devices 130 and 140 are located at a customer premises, such as a customer's home (as indicated by the dashed box surrounding these components in FIG. 2). In one implementation, STBs 110 may be connected to each other and home router 210 via a wired connection, such as a multimedia over coax (MoCA) connection. Other devices in the home network, such as user devices 130 and 140, may also connect to home router 210 via wireless connections (e.g., WiFi, Bluetooth, etc.) or wired connections.

Home router 210, also referred to herein as broadband home router 210 or residential gateway 210, may act as a hub for communications entering the customer's premises. For example, service provider 150 may communicate with one or more of the devices in a customer's home via network 170 to home router 210. Similarly, home router 210 may communicate with one or more devices at service provider 150 via network 170. Home router 210 may also communicate with one or more devices at content distribution system 160.

Service provider 150 may include VOD server 220 and policy manager 230. VOD server 220 may manage and provide video services, such as VOD services for customers. For example, VOD server 220 may provide movies and/or televisions shows in response to requests from clients via an interactive media guide (IMG) displayed on a television coupled to one of STBs 110, or on one of user devices 130/140.

Policy manager 230 may manage end-to-end quality of service associated with providing content, including VOD content, to customers. For example, policy manager 230 may ensure that links used in the delivery of content are not oversubscribed/over-loaded. Policy manager 230 may also limit the number of simultaneous sessions to a customer premises/household based on a customer's service level. As an example, a first level of service may provide Internet services with a predetermined download speed and a predetermined upload speed. The first level of service may also provide television/video services that allow for a certain number of shows/movies to be simultaneously downloaded and/or viewed. Different levels of service may be provided based on the particular subscription level. In each case, policy manager 230 may monitor and manage customer locations to provide the appropriate service level.

Broadband network gateway (BNG) 240, also referred to herein as gateway router 240, may be located at service provider 150 or elsewhere in network 100 (e.g., in network 170). BNG 240 may facilitate communications between service provider 150 and home router 210. For example, BNG 240 may transmit media streams from service provider 150 to home router 210 via network 170. BNG 240 may also receive requests and other information from a customer premises transmitted by home router 210 via network 170, as also described in detail below.

Content distribution system 160 may stream video content, such as VOD content, to home router 210 via network 170. Content distribution system 160 may also stream content, such as VOD content, to user devices 130 and 140 (via network 170) when user devices 130 and 140 are located outside the customer premises, as described below. Content distribution system 160 may include digital rights management (DRM) module 260. DRM module 260 may provide the appropriate controls on content provided to client devices to ensure that the content is provided only to authorized users/viewers and in accordance with the provider's desired controls.

As described briefly above, client devices (e.g., STBs 110, user devices 130, 140, etc.) may request VOD content while located in the customer premises (e.g., the customer's home). The client devices (e.g., user devices 130 and 140) may also request VOD content for delivery when located outside the customer premises. For example, FIG. 2 illustrates user devices 130 and 140 in dashed boxes, representing user devices 130 and 140 when they are located outside the customer premises. In such situations, content distribution system 160 and/or VOD server 220 may provide content directly to user devices 130 and 140, or provide content via a server or a proxy located in the customer premises, as described in more detail below.

Figure 3:
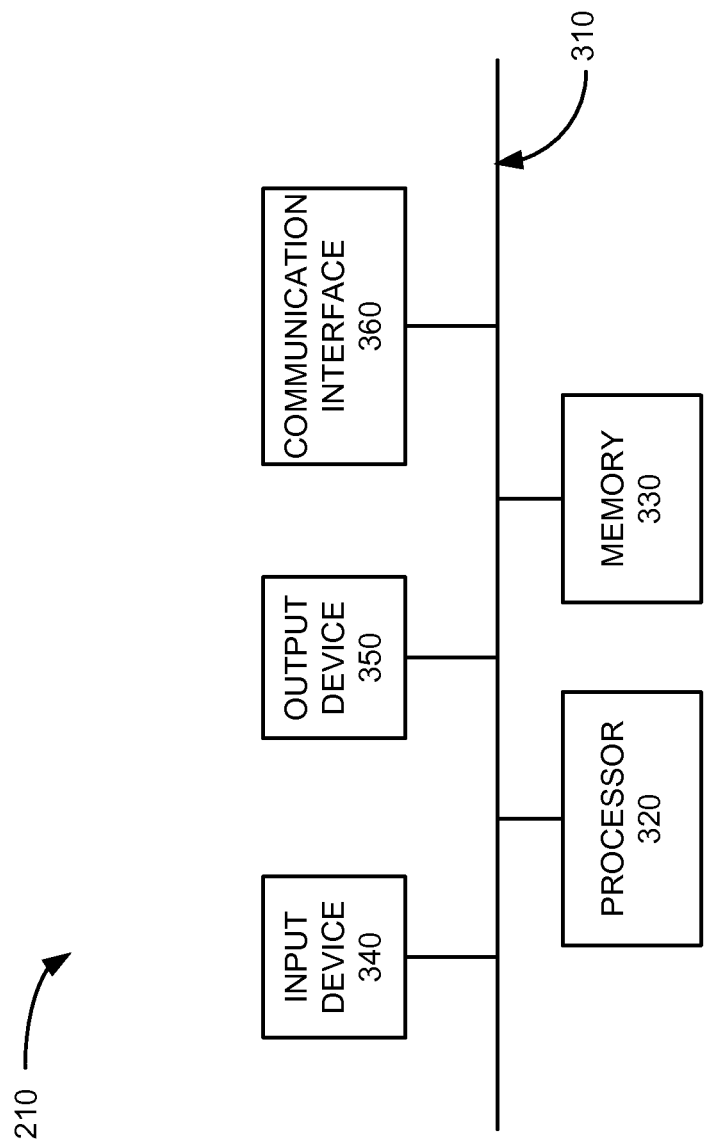
FIG. 3 illustrates an exemplary configuration of one or more of the components of FIG. 2.

FIG. 3 illustrates an exemplary configuration of home router 210. One or more of STBs 110, user device 130, user device 140, VOD server 220, policy manager 230, BNG 240, content distribution system 160 or DRM module 260 may be configured in a similar manner. Referring to FIG. 3, home router 210 may include a bus 310, a processor 320, a memory 330, an input device 340, an output device 350 and a communication interface 360. Bus 310 may include a path that permits communication among the elements of home router 210.

Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SDD). Memory 330 may also include a magnetic and/or optical recording medium (e.g., a hard disk) and its corresponding drive.

Input device 340 may include a mechanism that permits a user to input information to home router 210, such as a keyboard, a keypad, a mouse, a pen, a microphone, a touch screen, voice recognition and/or biometric mechanisms, etc. Input device 340 may also include mechanisms for receiving input via a remote control device, such as remote control 120, which may send commands to home router 210 via infrared (IR) or radio frequency signals. Output device 350 may output information to the user and may include a display (e.g., a liquid crystal display (LCD)), a printer, a speaker, etc.

Communication interface 360 may include one or more transceivers that home router 210 may use to communicate with other devices in a customer premises or at service provider 150. For example, communication interface 360 may include mechanisms for communicating with STBs 110, user devices 130/140, BNG 240 and OLT 250 via wired, wireless or optical mechanisms. Communication interface 360 may also include one or more radio frequency (RF) transmitters, receivers and/or transceivers and one or more antennas for transmitting and receiving RF data via network 170. Communication interface 360 may also include a modem or an Ethernet interface to a LAN or other mechanisms for communicating via a network, such as network 170 or another network via which home router 210 communicates with other devices/systems.

The exemplary configuration illustrated in FIG. 3 is provided for simplicity. It should be understood that home router 210 (and one or more of STBs 110, user devices 130/140, BNG 240 and OLT 250) may include more or fewer devices than illustrated in FIG. 3. For example, various modulating, demodulating, coding and/or decoding components, one or more power supplies or other components may be included in home router 210.

Home router 210 may perform processing associated with interacting with STBs 110, user devices 130/140, service provider 150, content distribution system 160, BNG 240 and OLT 250 and other devices in network 100. For example, home router 210 may perform processing associated with managing a user's home network, including providing VOD content to the client devices. Home router 210 may perform these operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Figure 4:
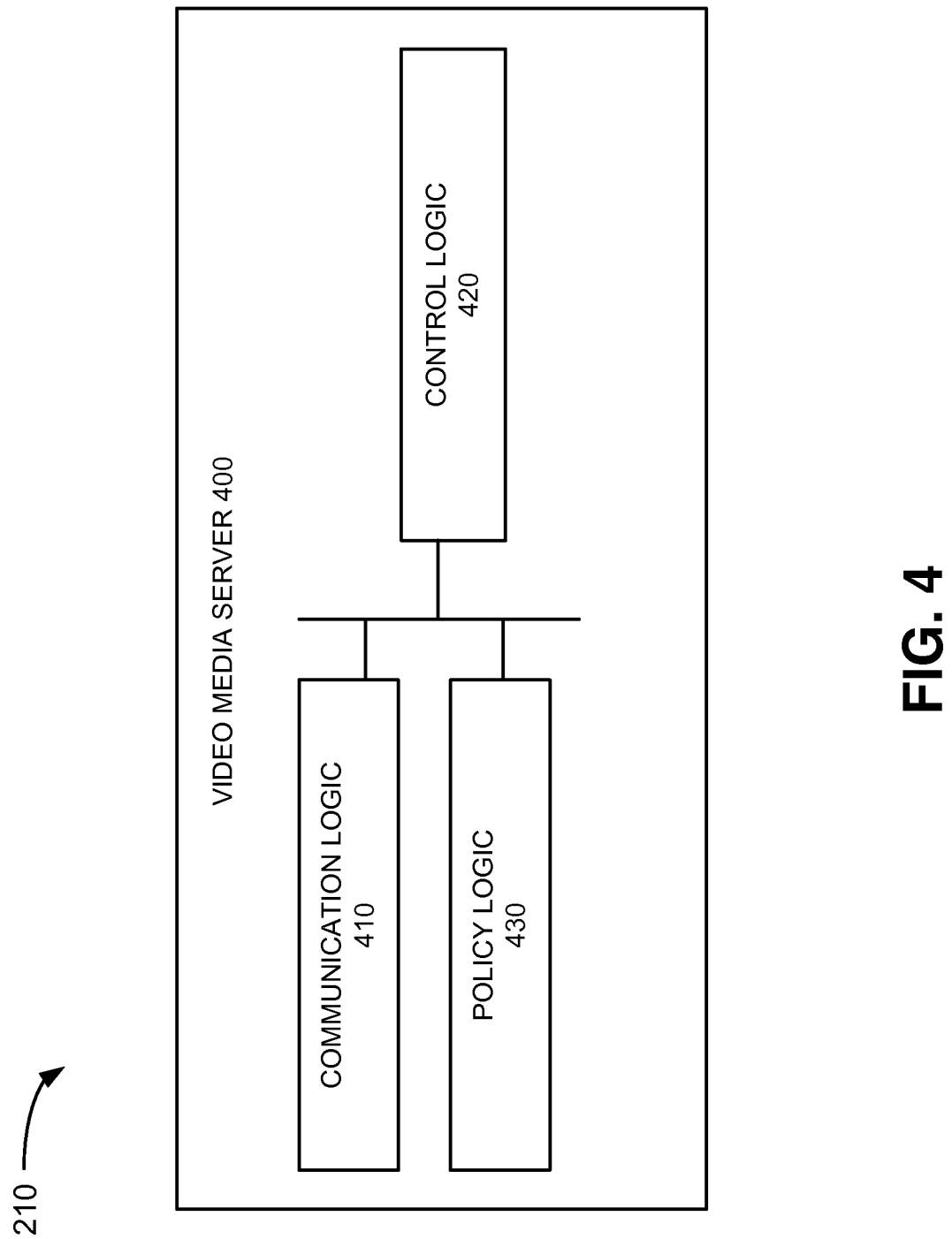
FIG. 4 is a functional block diagram of logic components implemented in the home router of FIG. 2.

FIG. 4 is an exemplary functional block diagram of components implemented in home router 210 of FIG. 3. In an exemplary implementation, all or some of the components illustrated in FIG. 4 may be stored in memory 330. For example, all of some of the components associated with video media server (VMS) 400 may implemented by processor 320 executing software instructions stored in, for example, memory 330.

Referring to FIG. 4, VMS 400 may include communication logic 410, control logic 420 and policy logic 430. VMS 400 and its various logic components are shown in FIG. 4 as being included in home router 210. In alternative implementations, these components or a portion of these components may be located externally with respect to home router 210. For example, in some implementations, one or more of the components of VMS 400 may be located in devices external to home router 210, such as in one of STBs 110 or another device in the customer premises. In still other implementations, one or more of the components illustrated in FIG. 4 may be located at service provider 150 and/or OLT 250.

Communication logic 410 may include logic for communicating with other devices in network 100. For example, communication logic 410 may receive requests for VOD content from one of STBs 110, user device 130 or user device 140. Communication logic 410 may forward these requests to control logic 420. Communication logic 410 may also transmit requests, such as VOD requests, and receive responses to the requests, such as data streams, from service provider 150 and/or content distribution system 160 via network 170.

Control logic 420 may include logic for controlling the operation of VMS 400. For example, control logic 420 may identify client device capabilities to facilitate the transfer of VOD content in an appropriate format for the requesting client device. For example, control logic 420 may identify the types of content format that the client devices (e.g., user devices 130 and 140) can process, types of communication protocols via which the client devices can communication, digital rights management (DRM) capabilities associated with the client devices, etc. Control logic 420 may use this information to ensure that content provided to the client devices is viewable/playable.

Policy logic 430 may include logic for managing a user's home network based on various policies stored in home router 210. For example, policy logic 430 may receive policy information from policy manager 230 upon boot-up of home router 210. Policy logic 430 may periodically update this information when changes occur in network 100, such as when a customer changes his/her level of service. Policy logic 430 may store these parameters and manage the customer's bandwidth usage. For example, policy logic 430 may allocate a certain amount of bandwidth within the home premises/network for different classes of traffic. As an example, policy logic 430 may allocate a certain amount of bandwidth for VOD traffic.

Figure 5:
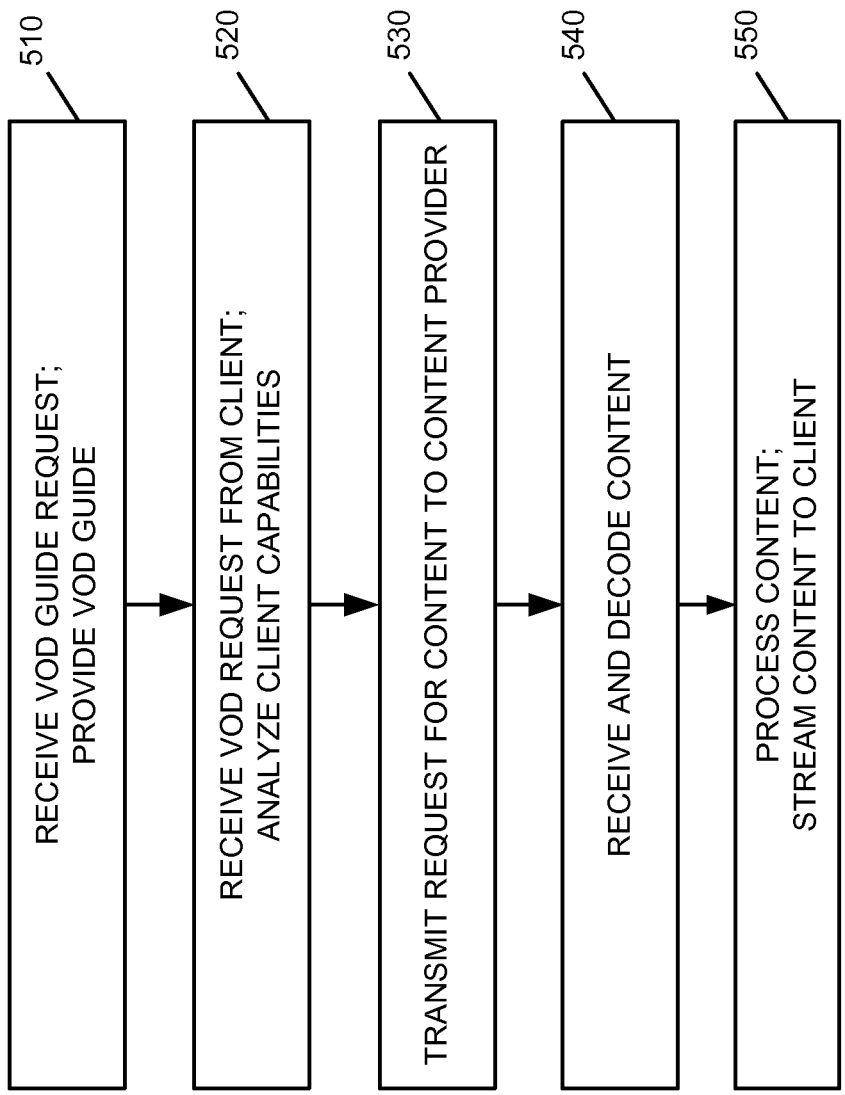
FIG. 5 is a flow diagram illustrating exemplary processing associated with the network of FIG. 2.
Figure 6:
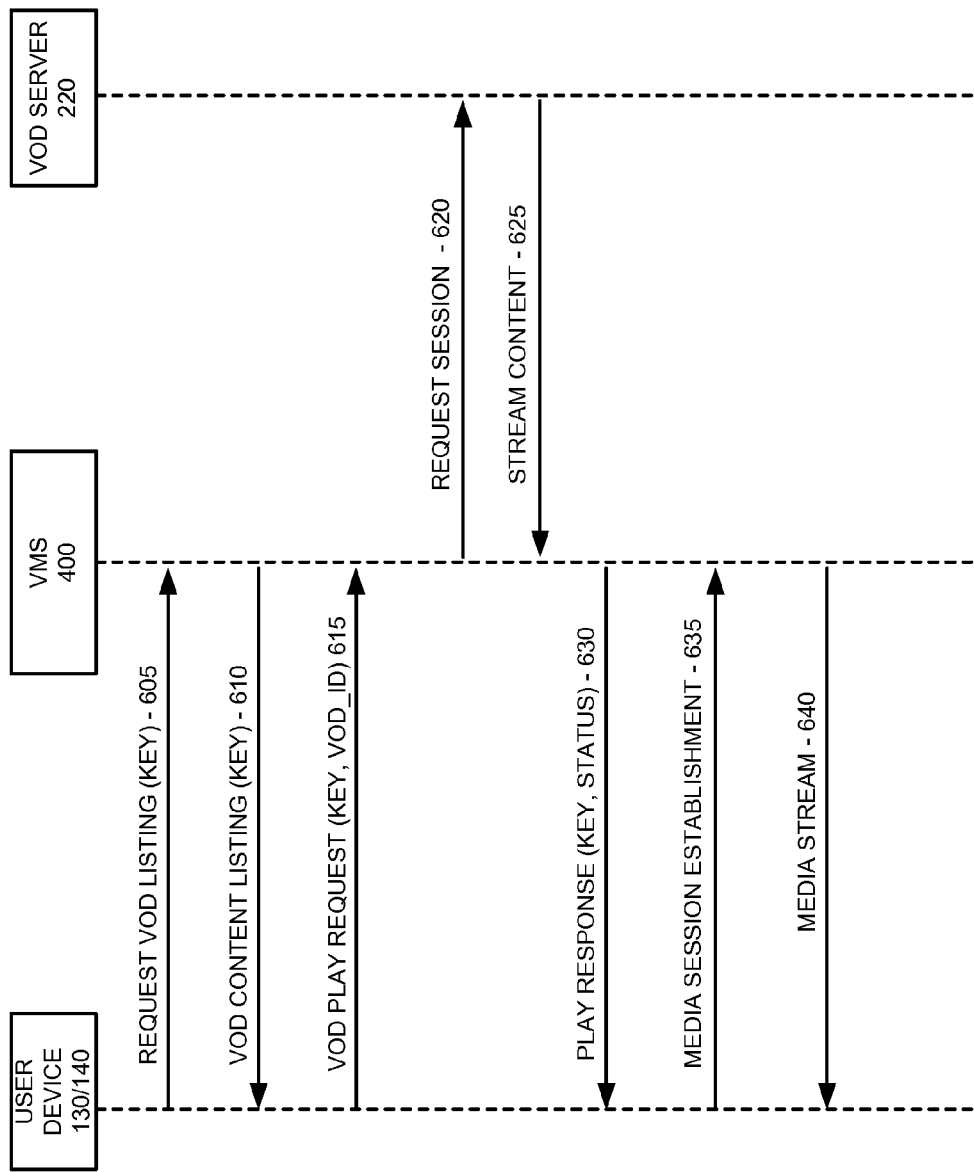
FIG. 6 is a signal flow diagram associated with the processing of FIG. 5.

FIG. 5 is a flow diagram illustrating exemplary processing associated with the network of FIG. 2, and FIG. 6 is a signal flow diagram illustrating the processing in FIG. 5. The processing of FIG. 5 will be described in connection with the signal flow diagram of FIG. 6. Processing may begin with one of the client devices located in the customer's home premises interacting with VMS 400 to request VOD content. For example, assume that a customer associated with user device 130 wishes to view a list of available VOD content. In this case, the customer, via user device 130, sends a message to VMS 400 via hypertext transfer protocol (HTTP), HTTP secure (HTTPS) or another protocol, requesting a guide (e.g., an interactive media guide (IMG)) or other type of listing to view available VOD content provided by service provider 150 (FIG. 5, block 510; FIG. 6, 605). The message from user device 130 may include a client key/code that identifies the client/customer.

VMS 400 receives the request and checks the validity of the client key. If the key is valid, control logic 420 generates a listing (e.g., a web page) of all available VOD content (e.g., movies, television shows, etc.) and transmits the listing to user device 130 (block 510; FIG. 6, 610). VMS 400 may also include the client key with the listing of VOD content.

User device 130 receives the transmission from VMS 400, checks the client key (if included) and displays the information via output device 350 (e.g., an LCD) of user device 130. Further assume that the customer associated with user device 130 makes a selection associated with a VOD movie. User device 130 transmits the selection to VMS 400 (615). The transmission to VMS 400 may include the client key and a VOD identifier (ID) associated with the selected content.

Communication logic 410 of VMS 400 receives the request associated with the VOD selection (block 520). VMS 400 may then analyze the capabilities associated with the client device from which the request was received (block 520). For example, control logic 420 may identify the coding/decoding capabilities of user device 130, such as determine whether user device 130 includes a coder/decoder (CODEC) that is able to play content having various formats (e.g., Moving Pictures Expert Group (MPEG) 2, MPEG 4, Flash, HTML5, etc.). Control logic 420 may also identify the transport mechanisms via which user device 130 is able to communicate (e.g., user datagram protocol (UDP), real time streaming protocol (RTSP), HTTP progressive, HTTPS, etc.). Control logic 420 may further identify the content protection/DRM support associated with user device 130. For example, control logic 420 may determine whether user device 130 uses digital transmission content protection (DTCP-IP), digital rights management (DRM) software or some other type of content protection mechanism that allows user device 130 to view content having content control/DRM protection.

In some implementations, VMS 400 may pre-store information identifying the coding/decoding capabilities, communication capabilities, DRM capabilities and/or other capabilities associated with any number of client devices that may communicate with VMS 400. For example, VMS 400 may store coding/decoding capabilities, DRM capabilities, transport protocols supported by each of the client devices in the customer's home premises (e.g., STBs 110, user devices 130 and 140, etc.). In other implementations, control logic 420 may interact with or interrogate user device 130 (and other client devices) to identify the client capabilities. For example, if the customer purchases a new device (e.g., a tablet computer) and wishes to use the new device to view VOD content, the customer may communicate (e.g., register) with VMS 400 via the new device and VMS 400 may interrogate the new device to identify the capabilities. In this manner, a new device may be configured "on the fly" to allow for viewing of VOD content.

In each case, VMS 400 may identify the content provider's available formats, content protection mechanisms, etc., associated with the selected content. For example, in this case, assume that VOD server 220 will be providing the content associated with the VOD request. VMS 400 may identify the available versions, including formats, DRM controls, etc., associated with the selected VOD content. For example, VMS 400 may communicate with VOD server 220 to identify whether the selected content is available in more than one format, with different DRM controls, etc.

Control logic 420 may identify the appropriate version of the selected content if more than one version/format is available (e.g., identify the content most compatible with the capabilities of the requesting client device) and send a request to VOD server for the particular content (block 530). For example, VMS 400 may transmit an RTSP message to VOD server 220 to establish a communication session to receive the VOD content/stream (FIG. 6, 620). The RTSP message may include the media access control (MAC) ID of user device 130. For example, VMS 400 may identify the MAC ID based on the VOD play request message (i.e., message 615). VOD server 220 may receive the request and establish a communication session to stream the request content to VMS 400 (FIG. 6, 625).

VMS 400 receives the streaming content from VOD server 220 (block 540). VMS 400 may begin to decrypt and/or decode the stream (block 540). VMS 400 may also process the content in accordance with capabilities associated with user device 130 (block 550). For example, VMS 400 may determine the type of encoding and/or encryption to be used to transport the media to user device 130. As an example, VMS 400 may determine that user device 130 supports DTCP-IP. In this case, VMS 400 may encrypt the content with DTCP-IP (if the content is not already encrypted with DTCP-IP). VMS 400 may also determine if the format of the received stream is compatible with capabilities of user device 130. If the format is not compatible, control logic 420 may transcode the content in accordance with the decoding capabilities of user device 130. For example, if user device 130 cannot decode MPEG 2 formatted content, but can decode MPEG 4 formatted content, and the stream from VOD server 220 is in MPEG 2 format, VMS 400 may transcode the content from MPEG 2 to MPEG 4.

VMS 400 may also send a response to user device 130 with the IP client key and the status identifying whether the request for VOD content was successful or failed (630). User device 130 receives the play response and if the play response indicates that the session with VOD server 220 was successfully established, user device 130 checks the validity of the received key. If the key is valid, user device 130 sends a message to VMS 400 to establish a media session to play the requested content (635).

VMS 400 may stream the content to user device 130 (block 550; FIG. 6, 640). For example, VMS 400 may receive a user datagram protocol (UDP) stream from VOD server 220. Control logic 420 may decrypt the content (e.g., MPEG content), if necessary. VMS 400 may also re-encode the decrypted stream into, for example HTTP live streaming (HLS) chunks, HTTP progressive chunks or data chunks having other formats/protocols compatible with user device 130 and apply the appropriate DRM that user device 130 supports.

In some implementations, VMS 400 may provide one or more uniform resource locators (URLs) to user device 130 (e.g., in a playlist or manifest file) for playback of the media stream. User device 130 receives the URL(s) associated with the processed stream and uses the provided URL(s) to play the media stream. As described above, user device 130 may support DTCP-IP. In this case, user device 130 may decrypt the media stream using DTCP-IP.

In this manner, VMS 400 acts as a proxy for facilitating media delivery to a customer's client devices. That is, VMS 400 allows a client device to request VOD content and provides the content in an appropriate format, along with appropriate content protection controls.

VMS 400 may also support "trick plays" associated with viewing VOD content. For example, assume that the user associated with user device 130 presses a rewind button or fast forward button on user device 130. In this case, VMS 400 may discard a current buffer of the VOD content and send a rewind or fast forward request to VOD server 220. VOD server 220 may respond with the appropriate portions/packets and stream the packets to VMS 400. VMS 400 may then process the packets, if necessary, and forward the packets to user device 130. In this manner, VMS 400 does not have to store buffers for the live stream, a fast forward stream and a rewind stream.

VMS 400 may also support multiple simultaneous VOD streams. For example, home router 210, on which VMS 400 may be implemented, may include multiple ports. Each port may be configured to support a VOD session with a client device simultaneously with the other ports. As an example, if user device 130 is receiving a VOD stream and user device 140 requests another VOD, user device 140 may transmit a request to VMS 400 similar to that described above with respect to user device 130. VMS 400 may forward the request to VOD server 220 and stream the content to user device 140 simultaneously with the stream being provided to user device 130. In one implementation, home router/VMS 400 may support six or more simultaneous VOD sessions with client devices.

VMS 400, as described above, may transcode VOD content based on decoding capabilities associated with the particular client device to which the content will be viewed. In some implementations, VMS 400 may also take into consideration bandwidth limits associated with a customer's home network. For example, if the customer's home network is limited to 5 Mb/s of download bandwidth and a particular VOD movie will place the customer's home network over the customer's bandwidth limit, VMS 400 may provide/transcode the VOD content at a lower resolution so that the movie may be provided to the user without exceeding the customer's bandwidth limit. In some implementations, VMS 400 may provide an alert/message to the client device inquiring whether the user would like to view the movie at a lower resolution (e.g., normal resolution as opposed to high definition, two-dimensional as opposed to three-dimensional, etc.) and allow the user to respond prior to providing the content.

As described above, client devices may interact with VMS 400 to obtain content provided by VOD server 220. In some instances, the content requested by one of client devices may not reside on VOD server 220. For example, the content may reside on content distribution system 160. As an example, content distribution system 160 may provide VOD content not available via VOD content server 220. In this case, VMS 400 may interact with content distribution system 160 in a manner similar to that described above with respect to interaction with VOD server 220. That is, VMS 400 may establish a session with content distribution system 160 to receive the streaming content, decrypt/transcode the content, if necessary, and forward the content to the appropriate client device. In such instances, DRM module 260 may ensure that the content includes the appropriate content protection mechanisms associated with protecting the content from unauthorized use.

As described above, VMS 400 may act as a proxy for client devices wishing to receive VOD content. In other instances, client devices may receive content directly from the content provider, such as VOD server 220 and/or content distribution system 160. For example, FIG. 2 illustrates user devices 130 and 140 located outside the customer premises. In this case, user devices 130 and 140 may receive VOD content from the appropriate content provider, with the appropriate content protection controls. For example, the client request from user devices 130 and 140 may include a client ID/key associated with obtaining VOD content. The content provider (e.g., VOD server 220 or content distribution system 160) may determine if the key is valid. If the ID/key is valid, the content may be streamed to the appropriate client device.

In other implementations, when client devices, such as user devices 130 and 140, are located outside the customer premises, VMS 400 may act as a proxy to ensure that the VOD content is delivered in a format compatible with the requesting client device. For example, in some instances, VMS 400 may receive a media stream received from VOD server 220 and/or content distribution system 160, process the media stream in accordance with the client device's capabilities (as described above), and forward the processed stream to the client device (e.g., user device 130 or 140) located outside the customer premises.

Implementations described herein facilitate the provisioning of content, such as VOD content, to client devices located both inside and outside a customer's home. In an exemplary implementation, a media device acts as a proxy for client devices to ensure that VOD content is provided to the client devices in accordance with the capabilities of the client devices. This may result in efficient provisioning of VOD content to customers.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to client devices interacting with VMS 400 to obtain VOD content. In other implementations, client devices may interact with VMS 400 to obtain other types of content that may require transcoding and/or content protection mechanisms.

Further, while series of acts and signal flows have been described with respect to FIGS. 5 and 6, the order of the acts and signal flows may be varied in other implementations. Moreover, non-dependent acts or signal flows may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:
1. A device, comprising:
a communication interface configured to receive a request from a client device, the request identifying a first one of a plurality of videos on demand; and
logic configured to:
identify capabilities associated with the client device, the capabilities including a content protection scheme supported by the client device and at least one of a decoding capability of the client device or a transport protocol via which the client device can communicate,
allocate a predetermined amount of bandwidth for each of a plurality of different classes of traffic in a customer premises in which the client device is located, wherein a first one of the classes of traffic comprises video on demand (VOD) traffic,
forward the request for the first VOD to a service provider associated with providing the first VOD,
receive a media stream from the service provider, the media stream corresponding to the first VOD, identify a VOD download bandwidth limit for the customer premises based on the predetermined amount of bandwidth allocated to VOD traffic,
process the media stream in accordance with the identified capabilities and in accordance with the VOD download bandwidth limit, and
forward the processed media stream to the client device,
wherein when processing the media stream in accordance with the VOD download bandwidth limit, the logic is configured to:
determine whether providing the media stream to the client device at a first resolution will place the customer premises over the VOD download bandwidth limit, and
transcode the media stream at a second resolution, lower than the first resolution, in response to determining that providing the media stream to the client device at the first resolution will place the customer premises over the VOD download bandwidth limit.

2. The device of claim 1, wherein when processing the media stream, the logic is configured to:
format the media stream based on the decoding capability of the client device, and
format the media stream based on the transport protocol via which the client device can communicate.

3. The device of claim 1, further comprising:
a plurality of ports configured to simultaneously support a plurality of VOD sessions, wherein each of the plurality of VOD sessions corresponds to a different VOD stream.

4. The device of claim 1, wherein when processing the media stream in accordance with the VOD download bandwidth limit, the logic is further configured to:
transcode the media stream at the first resolution in response to determining that providing the media stream at the first resolution will not place the customer premises over the VOD download bandwidth limit, wherein the transcoded media stream is provided to the client device at the first resolution without exceeding the VOD download bandwidth limit.

5. The device of claim 1, wherein the logic is further configured to:
transcode the received media stream in accordance with the decoding capability of the client device, and
when forwarding the processed media stream, the logic is configured to forward the transcoded media stream.

6. The device of claim 1, wherein the communication interface is further configured to:
receive a request from a second client device, the request identifying a second VOD, and
wherein the logic is further configured to:
identify capabilities associated with the second client device, the capabilities including a decoding capability of the second client device, a content protection scheme supported by the second client device and a transport protocol via which the second client device can communicate,
forward the request for the second VOD to an entity associated with providing the second VOD,
receive a second media stream from the service provider, the second media stream corresponding to the second VOD,
process the second media stream in accordance with the identified capabilities associated with the second client device, and
forward the processed second media stream to the second client device concurrently with the processed media stream being forwarded to the client device.

7. The device of claim 1, wherein the communication interface is further configured to:
receive at least one of a rewind request or a fast forward request from the client device, and wherein the logic is further configured to:
forward the rewind or fast forward request to the service provider,
receive content from the service provider based on the rewind or fast forward request, and
provide the content to the client device.

8. The device of claim 2, wherein when processing the media stream, the logic is further configured to:
provide content protection based on the content protection scheme supported by the client device.

9. The device of claim 8, wherein when processing the media stream, the logic is further configured to:
forward the stream using a transport protocol supported by the client device.

10. A method, comprising:
receiving a request from a client device, the request identifying a first video on demand (VOD);
identifying capabilities associated with the client device, the capabilities including a content protection scheme supported by the client device and at least one of a decoding capability of the client device or a transport protocol via which the client device can communicate;
allocating a predetermined amount of bandwidth for different classes of traffic in a customer premises in which the client device is located, wherein a first one of the classes of traffic comprises VOD traffic;
forwarding the request for the first VOD to an entity associated with providing the first VOD;
receiving a media stream from the entity, the media stream corresponding to the first VOD;
decrypting the media stream;
identifying a VOD download bandwidth limit for the customer premises,
processing the decrypted media stream in accordance with the identified capabilities and in accordance with the VOD download bandwidth limit; and
forwarding the processed media stream to the client device,
wherein processing the decrypted media stream in accordance with the VOD download bandwidth limit, comprises:
determining whether forwarding the media stream to the client device at a first resolution will place the customer premises over the VOD download bandwidth limit, and
transcoding the media stream at a second resolution, lower than the first resolution, in response to determining that forwarding the media stream at the first resolution will place the customer premises over the VOD download bandwidth limit.

11. The method of claim 10, wherein the processing the decrypted media stream comprises:
formatting the media stream based on the decoding capability of the client device, and
providing content protection based on the content protection scheme supported by the client device.

12. The method of claim 10, wherein processing the decrypted media stream in accordance with the VOD download bandwidth limit further comprises:
transcoding the media stream at the first resolution in response to determining that forwarding the media stream to the client device at the first resolution will not place the customer premises over the VOD download bandwidth limit.

13. The method of claim 10, further comprising:
receiving a request from a second client device, the request identifying a second VOD;
identifying capabilities associated with the second client device, the capabilities including at least one of a decoding capability of the second client device, a content protection scheme supported by the second client device, or a transport protocol via which the second client device can communicate;
forwarding the request for the second VOD to a network device associated with providing the second VOD;
receiving a second media stream from the network device, the second media stream corresponding to the second VOD;
processing the second media stream in accordance with the identified capabilities associated with the second client device; and
forwarding the processed second media stream to the second client device concurrently with the processed media stream being forwarded to the client device.

14. The method of claim 10, further comprising:
receiving at least one of a rewind request or a fast forward request from the client device;
forwarding the rewind or fast forward request to the entity;
receiving content from the entity based on the rewind or fast forward request; and
providing the content to the client device.

15. The method of claim 11, wherein the forwarding the media stream comprises:
forwarding the stream using a transport protocol supported by the client device.

16. The method of claim 10, wherein the receiving a request and identifying capabilities is implemented by a network device, the method further comprising:
supporting, by the network device, a plurality of simultaneous VOD sessions with a plurality of client devices, wherein each VOD session corresponds to a different VOD stream.

17. A system, comprising
a first device associated with a service provider, the first device being configured to provide video on demand (VOD) content; and
a second device associated with the service provider, the second device comprising:
a communication interface configured to receive a request from a client device, the request identifying a first VOD, and
logic configured to:
identify capabilities associated with the client device, the capabilities including a content protection scheme supported by the client device and at least one of a decoding capability of the client device or a transport protocol via which the client device can communicate,
allocate a predetermined amount of bandwidth for different classes of traffic in a customer premises in which the client device is located, wherein a first one of the classes of traffic comprises VOD traffic,
forward the request for the first VOD to the first device,
receive a media stream, corresponding to the first VOD, from the first device,
identify a VOD download bandwidth limit for the customer premises,
process the media stream in accordance with the identified capabilities and the identified VOD download bandwidth limit, and
forward the processed media stream to the client device,
wherein when processing the media stream in accordance with the VOD download bandwidth limit, the logic is configured to:
determine whether providing the media stream to the client device at a first resolution will place the customer premises over the VOD download bandwidth limit, and
transcode the media stream at a second resolution, lower than the first resolution, in response to determining that providing the media stream to the client device at the first resolution will place the customer premises over the VOD download bandwidth limit.

18. The system of claim 17, wherein when processing the media stream, the logic is configured to:
format the media stream based on the decoding capability of the client device, and
provide content protection based on the content protection scheme supported by the client device.

19. The system of claim 17, wherein the logic is further configured to:
identify a version of the first VOD available at the first device, based on the capabilities of the client device, and
wherein when forwarding the request for the first VOD, the logic is configured to:
forward the request for the identified version of the first VOD to the first device.

20. The system of claim 17, wherein the second device further comprises a plurality of ports configured to simultaneously support a plurality of VOD sessions, wherein each of the plurality of VOD sessions corresponds to a different VOD stream.

* * * * *